Feb. 20, 1968 H. FALK 3,370,273
SINGLE RELAY PROGRAMMER
Original Filed March 12, 1964
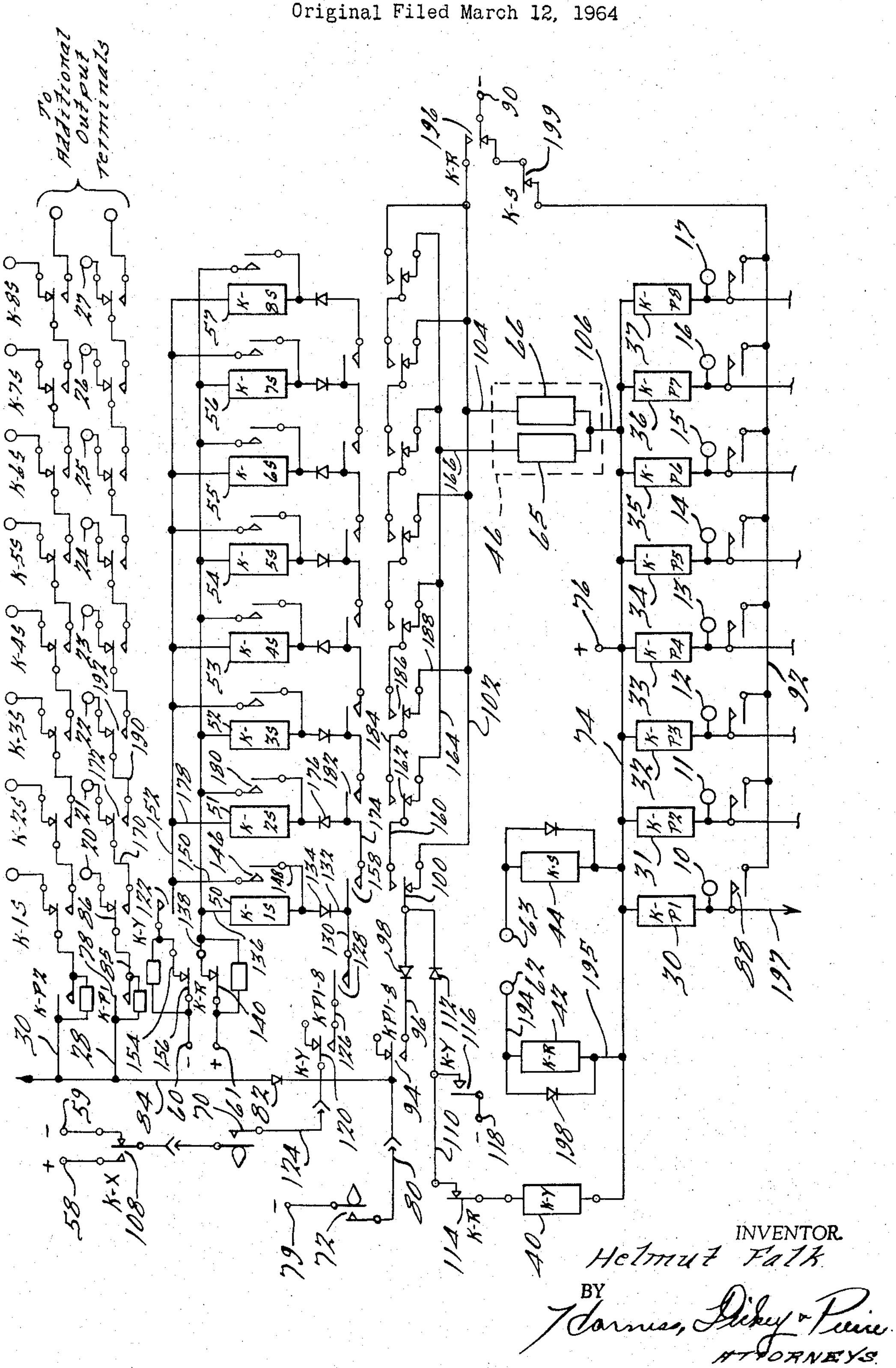
INVENTOR.
Helmut Falk
BY
Harness, Dickey & Pierce
ATTORNEYS.

United States Patent Office 3,370,273
Patented Feb. 20, 1968

3,370,273
SINGLE RELAY PROGRAMMER

Helmut Falk, Lake Orion, Mich., assignor, by mesne assignments, to Dura Corporation, a wholly owned subsidiary of Walter Kidde & Company, Inc., Oak Park, Mich., a corporation of New York Continuation of application Ser. No. 351,450, Mar. 12, 1964. This application June 13, 1966, Ser. No. 562,055
8 Claims. (Cl. 340—168)

This invention relates to a programming system and apparatus for use in converting one type of data storage code to another type of data storage code. This application is a continuation of my prior application, Ser. No. 351,450 filed Mar. 12, 1964, and now abandoned.

One of the most common types of data storage devices is the card device. Another common type of data storage device is the tape device. In general, data is stored on these devices by the expedient of punching holes in them in various combinations in selected locations. Each combination at a particular code column location represents a particular piece of information or data.

These different types of data storage devices are frequently used with different types of business machines operating in different manners. Consequently, in order to utilize the same information in different types of business machines, it is often necessary to "convert" the code on one type storage device utilized with one type of business machine to another code on a different type storage device for use with another type of business machine. In some instances, it may be necessary to "convert" the code on one type storage device to another code on the same type storage device when different business machinery is used.

For example, card type data storage devices may be coded with strictly figure-letter data for use with many types of business machinery such as computers. On the other hand, card or tape type data storage devices for use in automatic operation of a business machine such as a typewriter must also be coded with operational data utilized to cause functional actuation of the typewriter. Consequently, sometimes one type of code cannot be directly converted into another type of code without supplying appropriate control code as needed for automatic operation of the business machine.

It is, therefore, a general object of the present invention to provide new and improved code conversion apparatus.

Another object is to provide new and improved programming apparatus for incorporating functional machine operation code with figure-letter code during conversion from one type of code to another type of code.

A more specific object of the invention is to provide new and improved stepping relay program control apparatus. To this end, new and improved stepping relay circuitry is provided wherein the number of relays and other components required for programming particular functions is minimized.

An illustrative embodiment of the inventive principles is shown diagrammatically on the accompanying drawing.

The illustrative embodiment is specifically adapted for conversion of card code utilized with an IBM type key punch or the like to tape code for use with an automatically operable typewriter of the type described in copending application, Ser. No. 227,767, filed Oct. 2, 1962. Although the figure-letter card code can be used to generate signals for conversion into tape code capable of generating signals for typewriter printing operations, the card code does not provide any "convertible" signals representative of functional typewriter operations such as tabulation, carriage return, index, case shift, space and backspace, etc.

Card code signals may be generated by reader means of the key punch, or the like, and are received by a conventional card code conversion unit from which signals are sent to tape punch means whereat a tape is coded in accordance therewith. A programming unit incorporating the invention is associated with the code conversion unit and connected between the card reader and the tape punch. The programming unit is adapted to supply typewriter function signals to the tape punch as needed and other signals to control and correlate the input of the card code signals to the tape punch.

*In general*

The apparatus and circuitry shown on the drawing are adapted to program various typewriter functional operations in a code conversion operation in accordance with program selection signals received by input terminals 10–17 from the card code conversion unit. Program signals are transferred through output terminals 20–27 to cause the tape punch to put a code into the tape representative of, for example, a carriage return or tabulation or the like. It is to be understood that as many outlet terminals as necessary or desirable are provided along the output terminal level represented by the terminals 20–27. Additional output terminal levels may be provided as illustrated by the conductor 30 and the terminals associated therewith. The input signals are utilized to energize program relays 30–37, and it will also be understood that additional input terminals and program relays may be provided as necessary or desirable.

Control relays 40, 42, 44, 46 are provided to control energization and de-energization of stepping relays 50–57, which control the output signal pattern, from suitable sources of opposite potential in a unique manner. Certain of the control relays 42, 44, are selectively energized by control signals emanating from the associated equipment and received through suitable input terminals. The control relay 46 is a conventional relay having two alternately energizable coils and a mechanical latch to maintain the transfer mechanism in the transfer position obtained by energization of a coil after the coil is de-energized and until the other coil is subsequently energized.

The code converter system is synchronized with the associated apparatus by timing means in the form of cam operated switches which are opened and closed in a predetermined sequence by operational mechanism of the associated equipment. For example, in conventional key punch apparatus having reader means for generating input signals from coded cards, the cards are moved from code reading position to code reading position in step-by-step fashion. Switch cams associated with the key punch apparatus may be rotated 360° during each operational cycle, e.g., the time between movements of the coded cards from code reading position to code reading position, by mechanism of the key punch apparatus. In the illustrative embodiment, the stepping relays 50–57 are controlled by cam operated switches 70, 72. The switch cams are associated with the tape punch apparatus and are rotated 360° during each operational cycle resulting in movement of the tape in step-by-step fashion from one code punching position to the next code punching position. The cam switch 70 is adapted to close at 100° and open at 200° of rotation while the cam switch 72 is adapted to close at 270° and open at 20° of rotation.

*In operation*

The output terminals 20–27 are programmed, i.e., connected to particular tape coding control circuitry, in a particular manner so that energization of any particular one of the output terminals results in a predetermined control response. In addition, the output terminals can also be utilized with the card reader control circuitry to select particular data, to space or skip to data, to release or restart a particular card, etc.

For purposes of illustration, the invention is hereinafter described in detail by reference to operation of the system with a minimal program sufficient to illustrate the principles involved. Thus, for example, in use of name and address cards in an automatic typewriter system, it is necessary to generate carriage return signals and line feed signals. In order to select the correct level of program output terminals a selection pulse must be obtained before the information on the card is read. Consequently, contacts in the card reader are arranged to cause energization of the proper program relay illustratively represented by relay 30 which is adapted to select the level of output terminals 20–27 along conductor 28 with terminal 20 being connected to provide a Carriage Return tape code and terminal 21 being connected to provide a Line Feed tape code.

Assuming that the tape punch is initially located at 0° of the punch operational cycle, switch 70 is open and switch 72 is closed. A selection pulse is applied to input terminal 10 and causes energization of program relay 30 through conductor 74 to source of opposite potential 76. Contacts 78 are closed and program step No. 1 is effected as an output signal is supplied to output terminal 20 from source 79 through switch 72, conductor 80, diode 82 and conductor 84, conductor 28, closed contacts 78, conductor 85 and contacts 86. When the tape punch starts to cycle, a Carriage Return code is punched in the tape.

When program relay 30 is energized, a holding circuit is completed by closure of contacts 88 which connect sources of opposite potential 76, 90 through conductor 74 and a conductor 92.

Energization of program relay 30 also closes contacts 94 connecting sources of opposite potential 76, 79 through switch 72, conductors 80, 96 and diode 98, contacts 100, conductors 102, 104, relay coil 66, and conductors 106, 74. Energization of coil 66 insures that contacts 108 connect source 59 through switch 70.

Closure of contacts 94 also energizes relay 40 through conductor 96 and diode 98, conductor 110 and diode 112, contacts 114, and conductor 74. Energization of relay 40 closes contacts 116 to complete a holding circuit between sources of opposite potential 76, 118 and closes contacts 120 and 122. Therefore, when switch 72 is opened by its cam at 20° of the tape punch cycle, relay 40 remains energized.

Cam switch 70 closes at 100° of the tape punch cycle and sources of opposite potential 59, 61 are connected through contacts 108, switch 70, conductor 124, contacts 120, conductor 126, contacts 128 previously closed by program relay 30, conductors 130, 132 and diode 134, step relay 50, conductors 136, 138, and contacts 140. Energization of relay 50 closes contacts 146 to provide a holding circuit through conductors 148, 150, 152, previously closed contacts 122, conductor 154, and contacts 156 between sources of opposite potential 60, 61. Contacts 158 are closed and contacts 86, 100 are transferred.

At 270° of the tape punch cycle, switch 72 is closed by its cam and sources of opposite potential 76, 79 are connected through switch 72, conductor 80, contacts 94, conductor 96 and diode 98, previously transferred contacts 100, conductor 160, contacts 162, conductors 164, 166, relay coil 65, and conductors 106, 74. Relay coil 65 is energized and transfers contacts 108 to connect source 58 through switch 70.

When switch 72 is closed at 270° of the tape punch cycle, source 79 is also connected to output terminal 21 through conductor 80, diode 82 and conductor 84, conductor 28, closed contacts 78, conductor 85, contacts 86, conductor 170, and contacts 172. Consequently, step No. 2 of the selected program is effected and results in a Line Feed code signal being transmitted to the tape punch through output terminal 21. Suitable circuitry is provided to energize the punch clutch and the Line Feed code will be punched into the tape.

A new tape punch cycle is started with switch 72 opening at 20° and switch 70 closing at 100° of the tape punch cycle. Sources of opposite potential 58, 60 are connected to energize step relay 51 through contacts 108, switch 70, conductor 124, contacts 120, conductor 126, contacts 128, conductor 130, contacts 158, conductor 174 and diode 176, conductors 178, 152, contacts 122, conductor 154, and contacts 156. Contacts 180 are closed to complete a holding circuit between sources 60, 61, contacts 182 are closed, and contacts 162, 172 are transferred.

Relay coil 66 is energized when switch 72 is closed at 270° of the punch cycle by connecting source 79 to source 76 through switch 72, conductor 80, contacts 94, conductor 96 and diode 98, transferred contacts 100, conductor 160, transferred contacts 162, conductor 184, contacts 186, conductors 188, 102, 104, 106, 74. Contacts 108 are transferred to again connect source 59 through switch 70. In this manner, the relays 50–57 may be energized one after the other by alternately connecting the opposite sources of potential 58, 59, and 60, 61 through a single control switch 70.

If it is desired to reset the step relays without progressing through all of the step relays in the chosen level, the next one of the output terminals 20–27 adjacent the last program terminal may be connected to the input terminal 62 of control relay 42. In the exemplary program, output terminal 22 may be connected to input terminal 62 and at 270° of the tape punch cycle source 79 will supply a pulse to input terminal 22 through switch 72, conductor 80, diode 82 and conductor 84, conductor 28, closed contacts 78, conductor 85, transferred contacts 86, conductor 170, transferred contacts 172, conductor 190, and contacts 192. The output pulse from terminal 22 may be utilized to energize reset control relay 42 from the input terminal 62 through conductors 194, 195, 74 to source 76. Contacts 140, 156 are opened to de-energize the holding circuits for step relays 50, 51. Contacts 196 are transferred to de-energize the holding circuit for program relay 30 and to reset the relay 46 to the start position by energizing relay coil 66 from source 90 through conductors 102, 104, 106, 74 to source 76. However, relay 30 may be kept energized by a pulse, corresponding to the reset pulse, applied at input terminal 10 as long as the reset pulse is applied to input terminal 62. The reset pulse is interrupted after transfer of the contacts 140, 156 and contacts of program relay 30 may be arranged to transfer before the contacts 114 of reset relay 42 because diode 198 increases the hold time on relay 42. Conductor 197 associated with program relay 30 may be utilized to provide a feed back signal to energize an interlock relay or the like preventing continued operation of the code converter until the step relay transfer has been completed. Furthermore, suitable circuitry may be provided to energize the tape punch clutch and start a new read cycle in the key punch without an escapement or advancement of the card resulting in a re-reading of the same code on the card.

The stop control relay 44 is provided to suspend a programming cycle when energizing by applying a pulse to input terminal 63. Contacts 199 are opened and the holding circuits for the program relays will be interrupted. However, the step relays previously energized in the preceding program will remain energized and the transfer pattern of the step relay contacts will be maintained. Consequently, the remaining output terminals in any given level may be utilized for other programs.

The inventive principles may be otherwise variously embodied and certain details of arrangement and construction of the various camponents may be varied without departing from the proper scope or fair meaning of the appended claims.

The invention claimed is:

1. A stepping control system comprising:

a plurality of two position stepping relay means 50-57 arranged in succession, a plurality stepping circuit means 20–27 controllable by said stepping relay means and each stepping circuit means providing a plurality of selectable programs, a plurality of program relay means 30–37 for providing input signals to said control system to select one of the plurality of selectable programs, and control circuit means for successively actuating a series of said stepping relay means from one position to the other position and maintaining the actuated ones of said stepping relay means in the one position during the subsequent completion of the selected programs as a condition precedent to the actuation of successive ones of said stepping relay means.

2. The invention as defined in claim 1 and wherein said control circuit means comprises:

a source of potential and source conductor means for providing current of opposite polarity, first conductor means 122, 136, 138, 140, 146, 148, 150, 152, 154, 156, 178, 180 for connecting one side of each of said stepping relay means to the source of potential, alternate ones of said stepping relay means 50, 52, 54, 56 being connectable to the source of potential through source conductor means of one polarity and the other alternate ones of said stepping relay means 51, 53, 55, 57 being connectable to the source of potential through source conductor means of an opposite other polarity.

second conductor means 70, 108, 120, 124, 126, 128, 130, 132, 134 alternately energizable by current of opposite polarity.

and control means 40, 46, 70, 72 operative to connect said first conductor means to said second conductor means successively through said stepping relay means to sequentially energize said stepping relay means by connecting the alternate ones of said stepping relay means to said first conductor means when said first conductor means is energizable by current of a polarity opposite to the one polarity and by connecting the other ones of said stepping relay means to said first conductor means when said first conductor means is energized by current of an opposite polarity opposite to the other polarity.

3. A stepping control system comprising:

a plurality of two position stepping relay means 50–57 arranged in succession, source conductor means of positive DC potential 58, 61 and of negative DC potential 59, 60, first conductor means 136, 138, 140 for connecting one side of alternate ones of said stepping relay means 50, 52, 54, 56 to one of said source conductor means 61, second conductor means 122, 152, 154, 156, 178 for connecting one side of the alternate others of said stepping relay means 51, 53, 55, 57 to the other of said source conductor means 60, third conductor means 70, 108, 120, 124, 126, 128, 130, 132, 134 sequentially connectable with the other side of said stepping relay means, and control means 108 for alternately connecting said third conductor means to said source conductor means of positive potential 58 and to said source conductor means of negative potential 59, said control means including actuating means 46 for actuating said control means to alternately connect said third conductor means between source conductor means of opposite polarity to successively energize said stepping relay means.

4. A system for selectively energizing a series of output terminals 20–27 in response to signals received at any one of a plurality of input terminals 10–17 comprising:

a series of stepping relay means 50–57 arranged in succession and having contact means 78, 94, 126 controlling energization of said output terminals, first conductor means 136, 138, 140 for connecting one side of certain ones 50, 52, 54, 56 of said relay means to source conductor means 61 of one polarity, second conductor means 122, 152, 154, 156, 178 for connecting one side of the others of said relay means 51, 53, 55, 57 to source conductor means 60 of opposite polarity, separate source conductor means 58 of the one polarity, separate source conductor means 59 of the opposite polarity, intermediate conductor means 70, 108, 120, 124, 126, 128, 130, 132, 134 alternately connectable to said separate source conductor means and being connectable to the other side of said relay means to complete circuits causing successive actuation of the relay means, control means 46, 108 to change the polarity of said intermediate conductor means to a polarity opposite to the polarity on the one side of said relay means, and contact means 162, 186 operable by said relay means to actuate said control means.

5. A control system for selectively energizing a plurality of outlet terminals 20–27 in step-by-step fashion comprising:

a plurality of two position stepping relay means 50–57 arranged in succession for successive actuation from one position to the other position with actuation of successive ones of said relay means being dependent upon maintaining the previously actuated relay means in the one position.

first contact means 172, 192 operable by said stepping relay means and associated with said outlet terminals to cause step-by-step alternative energization thereof, relay circuit means comprising for each of said relay means:

first conductor means 136, 138, 140 and 122, 152, 154, 156, 178 connected to one side of said relay means and second conductor means 132, 134 and 174, 176 connected to the other side of said relay means, alternate ones of said relay means 50, 52, 54, 56 being connectable to source conductor means 61 of one polarity through said first conductor means, the other of said relay means 51, 53, 55, 57 being connectable to source conductor means of opposite polarity through said first conductor means, a common conductor means 70, 108, 120, 124, 126, 128, 130 connectable to said second conductor means, control relay means 46 having contacts 108 operable to alternately connect said common conductor means to source conductor means 58, 59 of opposite polarity, said common conductor means and said second conductor means forming a stepping relay means circuit with said first conductor means and being energizable when said common conductor means and said second conductor means are connected to source conductor means of polarity opposite to the polarity of the source conductor means connected to said first conductor means, and contact means 146, 158, 180, 182 operable by said stepping relay means to sequentially enable the relay circuit of successive relay means.

6. In a stepping system for converting card code signals to tape code signals, or the like:

a plurality of serially arranged sequentially energizable output terminals 20–27, output terminal contact means 86, 172, 192 for sequentially alternately connecting said output terminals in circuit with source conductor means 79.

two position stepping relay means 50–57 arranged in succession for sequentially actuating said output terminal contact means, each of said stepping relay means being sequentially actuable to one position and being maintained in the one position as a condition precedent to subsequent actuations of the following stepping relay means, each of said stepping relay means comprising first 70, 108, 120, 124, 126, 128, 130, 132, 134, 158, 174, 176 and second 122, 136, 138, 140, 152, 154, 156, 178 conductor means adapted to energize the stepping relay means when connected to source conductor means 58, 59, 60, 61 of opposite potential, alternate ones of said stepping relay means being connected to source conductor means of opposite potential by said second conductor means, control relay means 30–37, 40, 46 having a plurality of contact means 108, 120, 126 adapted to selectively alternately connect said first conductor means to source conductor means 58, 59 of opposite potential, all of the first conductor means of said stepping relay means being successively connectable to the source conductor means of opposite potential through said contact means of said control relay means, holding circuit means 146, 148, 150, 180 for each of said stepping relay means operable upon energization of the associated stepping relay means to maintain the actuated stepping relay means in the one position, an alteration circuit 72, 76, 79, 80, 94, 96, 98, 100, 102, 104, 106, 160, 162, 164, 166, 184, 186, 188 for said control relay means 46 having a plurality of control contacts 100, 162, 186 operable sequentially by said stepping relay means to alternately energize said control relay means and alternately acutate said contacts 108 of said control relay means to selectively alternately connect said first conductor means to source conductor means of opposite potential for sequentially actuating said stepping relay means, and timing switch means 70, 72 to sequentially alternately energize said stepping relay means and said control relay means.

7. A control system for sequentially energizing a plurality of stepping relay means 50–57 arranged in succession comprising:

a single two position control relay means 46 having contact means 108 in alternately energizable conductor means 70, 108, 120, 124, 126, 128, 130 alternately connectable to DC source conductor means 58, 59 of opposite polarity, said alternately energizable conductor means being connectable in circuit in parallel with one side of each of said stepping relay means, the other side of each of said stepping relay means being connectable to DC source conductor means 60, 61 of opposite polarity, the other side of alternate ones of said stepping relay means 50, 52, 54, 56 being connectable to source conductor means 61 of one polarity, the other side of the other ones of said stepping relay means 51, 53, 55, 57 being connectable to source conductor means 60 of opposite polarity, said contact means 108 being operable to sequentially connect said stepping relay means between source conductor means of opposite polarity by alternately connecting the alternately energizable conductor means on the one side of said stepping relay means to source conductor means of polarity opposite to the polarity of the source conductor means connected to the other side of said stepping relay means, contact means 158, 182 operable by said stepping relay means to sequentially connect said stepping relay means in circuit with said alternately energizable conductor means, and alteration circuits means 72, 79, 80, 96, 98, 100, 102, 104, 160, 162, 164, 166, 184, 186, 188 including contact means 162, 186 operable by said stepping relay means to change the position of said single two position control relay means and alternately connect said alternately energizable conductor means to source conductor means of opposite polarity.

8. A control system for alternately successively energizing relay means comprising:

a single connecting line on one side of said relay means and at least two circuit lines on the other side of said relay means, said circuit lines being of opposite polarity, and contact means associated with said relay means to selectively alternately change the polarity of said connecting line to cause sequential successive energization of said relay means.

No references cited.

THOMAS A. ROBINSON, *Primary Examiner.*